United States Patent [19]

Boillot et al.

[11] Patent Number: 5,401,784
[45] Date of Patent: Mar. 28, 1995

[54] INSOLUBLE POLYMER MATERIAL WITH CONDENSED REACTIVE SITES, METHOD OF PREPARATION OF SAID POLYMER AND APPLICATIONS

[75] Inventors: Beatrice M. J. Boillot, Paris; Rene E. Buvet, Creteil, both of France

[73] Assignee: Acome, Société Coopérative de Travailleurs, Paris, France

[21] Appl. No.: 957,067

[22] Filed: Oct. 6, 1992

Related U.S. Application Data

[63] Continuation of Ser. No. 418,732, Oct. 3, 1989, abandoned, which is a continuation of Ser. No. 219,404, Jul. 15, 1988, abandoned.

[30] Foreign Application Priority Data

Jul. 20, 1987 [FR] France ............................ 87 10207

[51] Int. Cl.⁶ ........................... C08J 5/20; C08J 3/28; C08L 23/36
[52] U.S. Cl. ...................................... 521/27; 521/31; 521/32; 525/330.1; 525/229.5; 525/329.8; 525/329.9; 525/382; 525/379; 525/386; 522/144; 435/180
[58] Field of Search ........................ 521/27, 31, 32; 525/330.1, 329.5, 329.8, 329.9, 382, 375, 386; 522/144; 435/180

[56] References Cited

U.S. PATENT DOCUMENTS

| 3,137,660 | 6/1964 | Jones | 525/329.9 |
| 3,247,133 | 4/1966 | Chen | 521/27 |
| 3,364,187 | 1/1968 | Wiggill | 525/329.8 |
| 3,394,113 | 7/1968 | Snyder | 525/329.8 |
| 3,634,372 | 1/1972 | McFadden | 525/329.9 |
| 3,839,172 | 10/1974 | Chapiro et al. | 521/31 |
| 4,137,137 | 1/1979 | Machi et al. | 204/159.16 |
| 4,415,679 | 11/1985 | Grot | 521/31 |

Primary Examiner—Thurman K. Page
Assistant Examiner—Peter F. Kulkosky
Attorney, Agent, or Firm—Finnegan, Henderson, Farabow, Garrett & Dunner

[57] ABSTRACT

The object of the present invention is a polymer material with reactive sites which is insoluble particularly in aqueous media, characterised in that it consists of a chemically inert polymer which is insoluble particularly in aqueous media and sufficiently reticulated to be usable in a defined configuration such as a membrane or tube configuration, and onto this polymer is grafted a monomer having at least one carboxyl group and/or a polymer of this monomer, all or part of the carboxyl groups of this insoluble and grafted reticulated polymer being converted into condensed groups which are more reactive than the corresponding carboxyl groups. It also relates to a method of preparing this material and to applications thereof.

8 Claims, No Drawings

INSOLUBLE POLYMER MATERIAL WITH CONDENSED REACTIVE SITES, METHOD OF PREPARATION OF SAID POLYMER AND APPLICATIONS

This application is a continuation of applications Ser. No. 07/418,732, filed Oct. 3, 1989, now abandoned, which is a continuation of application Ser. No. 07/219,404, filed Jul. 15, 1988, abandoned.

The object of the present invention is a polymer material with condensed reactive sites, which is insoluble particularly in aqueous media, as well as a method of preparing this material: it also relates to an application of this polymer material.

Membranes of reticulated polymer are already known which have grafted onto them at the core and/or on the surface carboxyl groups with concentrations which can reach 10 moles/kg of dry membrane. Such membranes are extremely hydrophilic and are endowed with properties of selective permeability, and have various applications in technology relating to separation by membranes.

The applicants noticed that the carboxyl groups grafted onto these membranes had a relatively low reactivity with respect to fixation by condensation of various compounds, which limits the applications of the said membranes, and therefore they sought to convert these carboxyl groups in a solid polymer phase into groups which are much more energy-rich and thus much more reactive. In this way they arrived at the present invention, namely a polymer material with reactive sites which is insoluble particularly in aqueous media, characterised in that it consists of a chemically inert polymer which is insoluble particularly in aqueous media and sufficiently reticulated to be usable in a defined configuration such as a membrane or tube configuration, and onto this polymer is grafted a monomer having at least one carboxyl group and/or a polymer of this monomer, all or part of the carboxyl groups of this insoluble and grafted reticulated polymer being converted into condensed groups which are more reactive than the corresponding carboxyl groups.

In order for the said chemically inert polymer to be usable in a defined configuration it is of necessity greatly reticulated. Because of this great reticulation it would have been expected that this polymer would only be permeable to external reactive agents at very low diffusion speeds and thus that the conversion of the carboxyl groups into more reactive condensed groups would be extremely difficult. In fact it has been found that, contrary to all expectations, this conversion has proved relatively easy due to the use of specific reagents and conditions.

In the foregoing and below, the term "condensed" covers the groups, sites or functions obtained by the union by covalent bond of two reagents with the elimination of one molecule of water.

In the polymer material according to the invention, the chemically inert polymer which is reticulated and insoluble can be of any type whatsoever. However, it is preferably chosen from amongst polyolefins, copolyolefins, fluorinated polymers and copolymers, polyamides and co-polyamides, which are reticulated and insoluble particularly in aqueous media. Amongst these the polymers which are particularly preferred are polyolefins and fluorinated polyolefins which are reticulated and insoluble particularly in aqueous media, such as a polyethylene or a polytetrafluoroethylene which is reticulated and insoluble particularly in aqueous media.

Furthermore, in the polymer material according to the invention the monomer with a carboxyl group advantageously consists of an ethylenically unsaturated carboxylic acid, particularly acrylic acid or methacrylic acid.

As regards the groups which are more reactive than the corresponding carboxyl groups, constituting the reactive sites of the polymer material, these are preferably chosen from amongst the acid anhydride groups, the active ester groups and the active thioester groups.

The present invention relates furthermore to a method of preparing the polymer material defined above. This method consists essentially of causing one or more dehydration agents to react on all or part of the carboxyl groups of a chemically inert polymer which is insoluble particularly in aqueous media and sufficiently reticulated to be usable in a defined configuration such as a membrane or tube configuration, this polymer having grafted onto it a monomer having at least one carboxyl group and/or a polymer of this monomer, the said polymer being preferably immersed in the course of this reaction in a solvent capable of causing it to swell. Dehydration agents should be understood to mean all agents capable of converting the carboxyl groups to condensed functions which are more energy-rich and thus more reactive than the corresponding converted carboxyl groups. In particular they are water elimination agents which convert the carboxyl groups into acid anhydride groups and the agents for formation of active ester or active thioester. Specific examples of such agents are thionyl chloride, phosphorus trichloride, acetic anhydride and dicyclohexylcarbodiimide alone or in the presence of at least one alcohol, thiol or phenol such as p-nitrophenol, which is capable of leading to the formation of active ester or thioester groups which are rich in energy.

The insoluble polymer which is reticulated and grafted and is put to use in this method can be obtained by any conventional method of great reticulation and grafting. However, it is preferably prepared by causing a monomer having at least one carboxyl group to react on a chemically inert polymer during or after irradiation of the said monomer and/or of the said polymer by a beam of accelerated electrons or by high-energy radiation. The beam of accelerated electrons and the radiation which are used should of course have sufficient energy to generate the formation of free radicals on the monomer and/or the chemically inert polymer: in addition, in order to engender the required great reticulation the irradiation will be advantageously carried out at doses at least equal to 1 megarad, the upper limit being the dose which causes the degradation of the monomer and/or polymer. It should be noted that in the course of this reaction there is produced simultaneously a reticulation of the chemically inert polymer, if appropriate polymerisation of the monomer having a carboxyl group and grafting of the said monomer and/or polymer of this monomer on the chemically inert polymer before, after and/or simultaneously with the reticulation of this latter polymer.

Such a method of reticulation and grafting is described for example in British Patent No. 1 588 625 to which reference may usefully be made.

The monomer with a carboxyl group is chosen from amongst those capable of being grafted by bringing into play a reaction calling for free radicals. It is a question in particular of ethylenically unsaturated carboxylic acids and, especially, of acrylic acid and methacrylic acid.

As regards the chemically inert polymer, this can be of any type whatsoever, but is nevertheless preferably chosen from amongst polyolefins or copolyolefins, fluorinated polymers and copolymers and polyamides and copolyamides. Amongst these the polyolefins and fluorinated polyolefins such as a polyethylene or a polytetrafluoroethylene are most particularly preferred.

It should be noted that whilst in the method of preparing the polymer material according to the invention an agent for eliminating water and an agent for forming active ester or thioester are put to use at the same time, it is advisable to provide simultaneously an excess of the agent for forming active ester or thioester and of the agent for eliminating water and the reticulated and grafted insoluble polymer with a view to converting the carboxyl groups which could not be esterified into acid anhydride groups.

It will be noted that it is advantageous in certain cases to utilise in the above-mentioned methods a reticulated and grafted insoluble polymer and a chemically inert polymer which have been preformed in order to confer on them a defined configuration such as a membrane or tube configuration; the utilisation of such polymers in fact makes it possible to obtain the polymer material according to the invention with this same configuration.

The polymer material defined above has many applications, particularly in the field of ion exchangers and in the biological and biotechnical field.

Thus it is possible by covalent bonds to fix on this polymer material one or more substrates supporting a nucleophilic groups or nucleophilic groups or having ion exchange properties, catalytic properties or biological properties, by causing one or more difunctional substrates bearing on the one hand the said group or groups and on the other hand a reactive function to react with the reactive sites of the said polymer material. In this way a polymeric substance is obtained which is insoluble particularly in aqueous media and supports substrates having nucleophilic properties, ion exchange properties, catalytic properties or biological properties. It should be noted that when the polymer material caused to react with the difunctional substrates mentioned above is presented in a defined configuration such as a membrane or tube configuration, the product of this reaction is obtained with this same configuration.

As such substrates the following could be cited for example: those supporting amine, hydroxyl and/or thiol functions such as mono- and diamines, amino acids and aminated macromolecular compounds such as polypeptides, proteins and enzymes, as well as the substrates supporting amine function capable, once fixed, of reacting in a specific manner with other molecules present in a medium, like antibodies for example.

The quantity of substrate fixed on the polymer material can be easily evaluated by infrared spectrophotometry or, if the fixed substrate absorbs the light (visible or ultraviolet), by spectrophotometry in the visible or the ultraviolet.

When the reactive sites of the polymer material consist of anhydride groups and these sites are for example brought into reaction with an excess of a diamine dialkylated on one of its nitrogen atoms, a carboxyl grouping is regenerated for each amine function which has reacted. It follows that after reaction of all or part of the anhydride groups of the polymer material, the resulting product has as many acid groupings as basic amine groupings. For this reason this product can be considered as amphoteric and can be used as amphoteric ion exchange means.

On the other hand, when the reactive sites of the polymer material consist of active ester or active thioester groups and each of these sites is brought for example to react with one of the amine functions of a diamine, there is a fixation of this diamine on the said polymer material and, after possible quaternisation of the remaining amine function, a substance which can be utilised as ion exchange means is obtained.

The present invention is explained below by a certain number of examples which are non-limiting.

Example 1: preparation of a polymer membrane having anhydride groups

A membrane of polyethylene which is reticulated and grafted by acrylic acid, for example obtained according to the method of British Patent No. 1 588 625, and having 4.2 moles of carboxyl groups per kg of dry membrane is immersed in liquid $SOCl_2$ at ambient temperature for several minutes. This results in a conversion of 98% of carboxyl groups into acid anhydride groups. The resulting membrane is then washed with the aid of anhydrous THF or any other anhydrous solvent which is not reactive on acid anhydride groups. It will be noted that instead of and in place of $SOCl_2$ any other dehydrating agents such as $PCl_3$ or acetic anhydride can be used with comparable results.

Example 2: preparation of a polymer membrane having anhydride groups

The membrane of polyethylene reticulated and grated by acrylic acid, which is used as the starting membrane in Example 1, is immersed for one hour at 50° C. in a solution of 0.24M of dicyclohexylcarbodiimide (DCCI) in THF or DMF. This results in dehydration of the neighbouring carboxyl groups to anhydride groups at a level such that the absorption bonds of the COOH functions are no longer visible in infrared spectroscopy, that is at a level estimated at more than 99%.

Example 3: preparation of a polymer membrane having active ester groups

The membrane of polyethylene reticulated and grafted by acrylic acid, which is used as the starting membrane in Example 1, is immersed in a mixture containing 0.5M of paranitrophenol and 0.5M of DCCI in THF or DMF. At 50° C. the transformation of the carboxyl groups into paranitrophenol ester groups is effected to more than 95%. The remaining carboxyl groups which are not esterified are converted into anhydride groups by the action of DCCI which has not reacted.

Example 4: preparation of an amphoteric ion exchange polymer membrane

The membrane obtained in accordance with Examples 1 and 2 are immersed in a phosphate buffer medium of pH 12 at molar concentration in N,N-dimethylethylenediamine (N,N-DMED) at ambient temperature for several hours. The resulting membranes are then rinsed in succession by an aqueous solution diluted with a strong base and an aqueous solution diluted with a strong acid. This results in an amphoteric membrane in which 50% of the original carboxyl groups have been converted into N,N-dimethylethylenecarboxamide groups.

Example 5: preparation of an anion exchange polymer membrane

The treatment of the membrane obtained in accordance with Example 3 by a molar solution of N,N-DMED in THF, $CH_2Cl_2$ or DMF leads to a membrane in which more than 95% of the original carboxyl groups have been converted into N,N-dimethylethylenecarboxamide groups. Thus after possible quarternisation an anion exchange membrane is obtained which is stable in a strong base medium at 60° C.

Example b 6: preparation of a polymer membrane having amino acid patterns

By immersion of the polymer membrane obtained in Examples 1 or 2 in an aqueous solution neutralised at pH 12 of any biological α-amino acid whatsoever at a concentration of 0.24M, a polymer membrane is obtained which contains the said α-amino acid fixed in amide form. Depending upon the amino acid which is used, this latter is fixed on 15 to 30% of the original carboxyl groups. When histidine is used for example as the amino acid, there is fixation on approximately 20% of the original carboxyl groups. In the same conditions, grafting of proteins endowed for example with enzymatic activity is obtained when the said proteins have accessible amine functional groups.

We claim:

1. Method of preparing a polymer substance which is insoluble in aqueous media and bears substrates having nucleophilic properties, ion exchange properties, catalytic properties or biological properties characterized in that it comprises causing one or more difunctional substrates bearing on the one hand a reactive function and on the other hand a nucleophilic group or groups or having ion exchange properties, catalytic properties or biological properties to react with the reactive sites of a polymer material which is insoluble in aqueous media and comprises a chemically inert polymer selected from polyolefins, copolyolefins, polyamides, copolyamides and fluorinated polyolefins, wherein said polymer is insoluble in aqueous media, and sufficiently reticulated to be usable in a defined configuration, said chemically inert polymer having grafted thereon a monomer having one or more carboxyl groups and/or a polymer of said monomer, at least a portion of said carboxyl groups having been chemically reacted to form one or more condensed groups selected from an acid anhydride group, an active ester group and an active thioester group, said substrates being selected from mono- and diamines, amino acids, polypeptides, proteins and enzymes.

2. The method of claim 1, wherein said substrates are selected from mono- and diamines and amino acids.

3. The method of claim 1, wherein said substrates are selected from mono- and diamines and amino acids.

4. A polymer material formed by the method of claim 1.

5. The method of claim 1, characterized in that in the course of the reaction said polymer is immersed in a solvent which is capable of causing it to swell.

6. The method of claim 1, characterized in that the said insoluble polymer which is reticulated and grafted is obtained by reaction of a monomer having at least one carboxyl group on the chemically inert polymer during or after irradiation of said monomer at doses at least equal to 1 megarad by a beam of accelerated electrons or by high-energy radiation.

7. The method of claim 6, characterized in that the said monomer is an ethylenically unsaturated carboxylic acid.

8. Polymer material with reactive sites which is insoluble in aqueous media, characterized in that it comprises a chemically inert polymer selected from polyolefins, copolyolefins, polyamides, copolyamides and fluorinated polyolefins, wherein said polymer is insoluble in aqueous media, and sufficiently reticulated to be usable in a defined configuration, said chemically inert polymer having grafted thereon a monomer having one or more carboxyl groups and/or a polymer of said monomer, at least a portion of said carboxyl groups having been chemically reacted to form one or more condensed groups selected from an acid anhydride group, an active ester group and an active thioester group, wherein reactive sites of said polymer material are reacted with a difunctional substrate selected from mono- and diamines, amino acids, polypeptides, proteins and enzymes.

* * * * *

UNITED STATES PATENT AND TRADEMARK OFFICE
CERTIFICATE OF CORRECTION

PATENT NO. : 5,401,784
DATED : March 28, 1995
INVENTOR(S) : BOILLOT et al.

It is certified that error appears in the above-identified patent and that said Letters Patent is hereby corrected as shown below:

Col. 6, lines 8-9, claim 3 should be deleted in its entirety.

Signed and Sealed this

Twenty-fifth Day of July, 1995

Attest:

BRUCE LEHMAN

*Attesting Officer*    *Commissioner of Patents and Trademarks*